United States Patent [19]

Solomon

[11] 4,337,140
[45] Jun. 29, 1982

[54] STRENGTHENING OF CARBON BLACK-TEFLON-CONTAINING ELECTRODES

[75] Inventor: Frank Solomon, Great Neck, N.Y.

[73] Assignee: Diamond Shamrock Corporation, Dallas, Tex.

[21] Appl. No.: 202,876

[22] Filed: Oct. 31, 1980

[51] Int. Cl.$^3$ .................... C25B 11/03; C25B 11/04; H01M 4/92
[52] U.S. Cl. .................... 204/292; 208/294; 429/42; 429/45
[58] Field of Search .................... 204/296, 292, 294; 429/42, 45

[56] References Cited

U.S. PATENT DOCUMENTS

| | | | |
|---|---|---|---|
| 3,409,472 | 1/1968 | Weber et al. | 429/45 |
| 3,935,029 | 1/1976 | Baker et al. | 429/42 |
| 4,058,482 | 11/1977 | Baris | 252/425.3 |
| 4,150,076 | 4/1979 | Baris | 264/49 |
| 4,170,540 | 10/1979 | Lazarz | 204/296 |
| 4,187,350 | 2/1980 | McIntyre et al. | 429/45 |
| 4,249,682 | 11/1981 | Oda et al. | 204/265 |

FOREIGN PATENT DOCUMENTS 1237934  7/1971  United Kingdom ............ 204/290 R
1284054  8/1972  United Kingdom ............ 204/290 R

OTHER PUBLICATIONS

Kroon, D. F. et al., *Elsevier Sequoia Patent Reports*, Fuel Cell Electrodes: Part 1, vol. 5, pp. 5, 112; 1974.
Landi et al., Advances in Chem. Series, Amer. Chem. Soc., pp. 13-23 (1969).

*Primary Examiner*—F. Edmundson
*Attorney, Agent, or Firm*—John P. Hazzard

[57] ABSTRACT

This disclosure is directed to strengthening carbon black-particulate "Teflon" (PTFE) mixes destined to be formed into active layers in air cathodes, which comprises forming the carbon black-particulate Teflon mix; fibrillating said mix along with a substantial quantity of soluble pore-forming agent; adding polytetrafluoroethylene (PTFE) fibers while chopping said fibrillated mix; and thereafter rolling said chopped fibrillated mix containing said PTFE fibers into sheet form.

5 Claims, No Drawings

STRENGTHENING OF CARBON BLACK-TEFLON-CONTAINING ELECTRODES

BACKGROUND OF THE INVENTION

The present invention is directed to electrochemical cells and more particularly to a method of preparing a carbon black active layer for a cathode which can be used in a chlor-alkali cell. Chlor-alkali cells are well-known cells used in industry. In a chlor-alkali cell, an electric current is passed through a saturated brine (sodium chloride salt) aqueous solution to produce chlorine gas and caustic soda (sodium hydroxide). The caustic environment present in chloralkali cells presents a very corrosive atmosphere for the anode and cathode. Various attempts have been made to achieve cost savings in respect of the electrical energy necessary to operate chlor-alkali cells. An unwanted byproduct of the production of chlorine and caustic soda is the production of hydrogen gas at the cathode of the chlor-alkali cell. It has been estimated that approximately as much as 25 percent of the electric power required to operate chlor-alkali cells is used in the unwanted production of hydrogen at the cathode. Hence if the production of hydrogen gas can be eliminated, substantial economic savings in the cost of the electric power required to operate chlor-alkali cells can be achieved. Oxygen (air) cathodes eliminate the production of hydrogen at the cathode and force the formation of hydroxide ions.

One known form of cathode active layer, viz., layer which contains the active component or material, is an active cathode layer containing carbon black. Due to the very corrosive nature of the catholyte liquor, viz., the liquid medium with which the cathode is in contact in such chlor-alkali cells, various attempts have been made to reduce the wettability of the carbon black which constitutes the active component. The caustic soda has a tendency to wet the pores of the carbon black thereby reducing its efficiency and activity. Consequently, various materials have been employed to reduce the wettability and thereby increase the length of time for which the carbon black is effective.

Polytetrafluoroethylene (PTFE), in particulate form, has been employed in the carbon black active cathode layer in order to impart hydrophobicity to the carbon black cathode. Some cathode structures utilize layers of polytetrafluoroethylene, per se, with or without pore-forming materials to form protective or backing sheets, viz., protective sheets to further increase the hydrophobicity of the carbon black cathodes on the air side. Pore-forming agents are customarily utilized to impart porosity to the overall cathode structure so as to enhance contact between oxygen (or air) and catholyte, which may fill the larger pores. Of course, when water-soluble pore-forming agents are employed to produce such backing layers (which are subsequently secured to the active carbon black-containing layer to form a laminated assembly cathode, e.g., by lamination using heat and pressure), the pore-forming agent must be removed after formation of the laminated cathode. It was discovered that after laminating such carbon black (active) layer to the leachable pore former—PTFE layer using heat and high pressure, e.g., temperatures ranging from about 110° to 125° C. and pressures ranging from about 4 to about 10 tons per square inch, severe blistering of the carbon black-containing active layer occurred during the water washing step. This blistering in essence destroyed the structural integrity of the laminated cathode.

FIELD OF THE INVENTION

The present invention is directed to the production of improved laminated cathode assemblies comprised of an active layer containing carbon black-particulate "Teflon" mix laminated to a current distributor and a backing layer of PTFE water-soluble pore former, said laminated assembly having a resistance to blistering and hence structural degradation when contacted with water in a washing step(s) to remove the water-soluble pore former.

PRIOR ART

At pages 5 to 6 of Fuel Cell Electrodes, Part 2 of the Elsevier Sequoia Patent Reports, Part 1, Volume 5, published in 1974 by Elsevier S. A. Lausanne, Switzerland, reference is made to British Patent No. 1,237,934 to Binder et al as disclosing carbon electrodes with a precisely controlled degree of water repellency in which a powder of conductive carbon, a PTFE or other resin powder and a finely divided pore-forming agent were mixed together and placed on a second layer of resin supported on a porous PTFE sheet. The three layers are bonded together and give a carbon layer on resin matrix. Sodium sulfate is one example of a pore-forming agent.

U.S. Pat. No. 4,058,482 to Baris et al discloses a sheet material, principally comprised of a polymer such as polytetrafluoroethylene and a pore-forming material wherein the sheet is formed of coagglomerates of the PTFE polymer and the pore former. This patent teaches mixing polymer particles with positively charged particles of a pore former, such as zinc oxide, to form coagglomerates thereof followed by mixing same with a catalyst suspension so as to form coagglomerates of catalyst and polymer pore former agglomerates and then pressing, drying and sintering these coagglomerates. Subsequent to the sintering, the pore former can be leached out of the electrodes.

Baris et al U.S. Pat. No. 4,150,076 (a division of U.S. Pat. No. 4,058,482) is directed to the process for forming the sheet of U.S. Pat. No. 4,058,482, said process involving formation of polymer-pore former coagglomerates, distributing same as a layer on a suitable electrode support plate, for example, a carbon paper, to form a fuel cell electrode by a process including pressing, drying, sintering and leaching. The preceding comments in relation to U.S. Pat. No. 4,058,482 are likewise applicable to U.S. Pat. No. 4,150,076.

U.S. Pat. No. 4,170,540 to Lazarz et al discloses microporous membrane material suitable for electrolytic cell utilization formed from blending particulate PTFE, a dry pore-forming particulate material and an organic lubricant. These three materials are milled and formed into a sheet which is rolled to the desired thickness, sintered and subjected to leaching of the pore-forming material.

Boden et al British patent No. 1,284,054 is directed to forming an air-breathing electrode containing an electrolyte within an air-depolarized cell. This air-breathing electrode is made by hot pressing a fluoro polymer sheet containing a pore-forming agent onto a catalyst compositon (containing silver) and a metallic grid member. According to page three of said British patent, the PTFE-pore-forming agent-paraffin wax-containing sheet is subjected to a solvent wash to remove the paraffin wax (lubricant and binder) and then sintered in a sintering furnace of the appropriate temperatures for sintering the fluorocarbon polymer. After the PTFE-containing sheet is sintered and while it still contains the pore-forming particles, it is then ready for application to the catalyst composition of the air electrode for the hot pressing operation. Hot pressing involves the use of pressures ranging from about 5,000 to about 30,000 psi in conjunction with temperatures ranging from 200° F. to 400° F.

None of these patents discloses use of "Teflon" (PTFE) fibers to strengthen electrode active layers containing particulate PTFE.

DETAILED DESCRIPTION OF THE INVENTION

As mentioned hereinabove, the present invention is based upon the discovery that severe blistering of the active carbon black-containing layer in laminated form such as occurs during washing of said laminate can be minimized or substantially avoided, hence avoiding structural degradation of the laminate, by a process involving mixing carbon black and particulate PTFE, chopping said mix, fibrillating said carbon black-particulate "Teflon" mix with a substantial quantity of particulate, water-soluble pore-forming agent followed by chopping said fibrillated mix and adding PTFE fibers characterized by an average length ranging from about 0.005 to about 0.05 inch and more usually from about 0.008 to about 0.032 inch, e.g., about 0.016 inch, and a denier (per filament) of from about 3 to about 10, and more usually from about 5 to about 9, e.g., 6.5 to 7. The PTFE fibers are added preferably during the second chopping step, viz, which follows the fibrillation, before rolling of said material into sheet form.

The carbon black particles whose use is contemplated herein are carbon blacks having a particle size ranging from about 0.01 to 0.3 microns, and more usually within the 0.02 to about 0.1 micron range. According to a preferred embodiment of this invention, acetylene black carbon particles are utilized, such as the commercially available "XC-72R" carbon black available from Cabot Corporation.

The particulate PTFE is derived from a dispersion, such as duPont's "Teflon 30" containing "Teflon" particles ranging in size from about 0.05 to about 0.2 micron. Such PTFE dispersion contains PTFE particles in a form suitable for mixing with said carbon black particles.

The aforementioned PTFE dispersion is preferably initially mixed with the carbon black in weight ratios of from 20 to 40 weight parts of particulate PTFE to about 60 to 80 weight parts of carbon black. The mixing is conducted by diluting said PTFE dispersion, 40 to 60 ml of water per ml of dispersion, and adding it to the slurry of carbon black with stirring to arrive at mixtures containing from about 70 to 90 weight percent carbon black and 10 to 30 weight percent PTFE, e.g., 80 weight percent carbon black and 20 weight percent PTFE. The mix is then washed and dried prior to chopping and fibrillation.

Subsequent to the mixing step, the carbon-particulate-PTFE mix is subjected to a fibrillation step with a substantial quantity of a pore-forming agent. Suitable pore-forming agents whose use is contemplated within the present invention include but are not limited to soluble pore-forming agents, e.g., sodium carbonate, sodium benzoate and the like. From 20 to 50 weight percent pore former (based on total mix) can be used. The total mix includes particulate PTFE, carbon black and pore former.

The fibrillation step is conducted by taking the carbon black-particulate PTFE and pore former mix and placing it in a Brabender Prep Center having medium shear blades. The mix is subjected to the shear-blending forces over a 1- to 5-minute period. The mix is lubricated with isopropyl alcohol and is subjected to the shear-blending forces at 15 to 30 r.p.m. at from ambient temperature to 50° C.

Subsequent to this fibrillating step, the fibrillated mix of carbon black-particulate-PTFE-soluble pore-forming agent is subjected to chopping and the "Teflon" fibers are added during chopping. Suitable exemplary PTFE ("Teflon") fibers which can be employed in accordance with this invention are the commercially available "Teflon Fiber Flock" having an average length of one-sixty fourth inch and a denier (per filament) of 6.7. The chopping is conducted under conditions to reduce the fibrillated material to particles suitable for hot rolling (60° to 90° C.) and to distribute the "Teflon" fibers uniformly throughout the granulated mix. After addition of the Teflon fibers during chopping as mentioned above, the resulting material, in particulate form, is formed by rolling between chrome-plated steel calendar rolls. Subsequent to formation in sheet form as noted above, the carbon black-containing active layer sheets can be formed into oxygen (air) cathodes by lamination to a current distributor layer, such as a $50 \times 50 \times 0.005$ inch silver-plated nickel wire cloth and a PTFE-containing wetproofing layer. The lamination can be done in a hydraulic press at 115° C. and pressures ranging from about 1.5 to about 8.5 $T/in^2$ (tons per square inch).

Subsequent to the formation of the oxygen cathodes as noted above, they are subjected to a water washing operation to remove the previously incorporated water-soluble pore-forming agent. The water washing is conducted at approximately 65° C., preferably using deionized water until the pore former is removed.

The thus-formed electrode can be catalyzed with a precious metal catalyst, e.g., platinum, silver, etc. E.g., platinum can be deposited thereon by the procedure described and claimed in U.S. patent application Ser. No. 202,572 (Docket 3201) entitled "Post Platinizing High Surface Area Carbon Black" filed in the name of Lawrence J. Gestaut of even date herewith. The disclosure of this application is incorporated herein by reference.

The thus-formed active layer when laminated to a current distributor was successfully employed as a cathode in a chlor-alkali laboratory test cell for over 150 hours prior to failure even though the laminate contained no hydrophobic (backing) layer to protect the active layer from wetting. The failure was due to excessive wetting.

The invention will be illustrated in further detail in the following example in which all parts, percents and ratios are by weight unless otherwise indicated.

EXAMPLE

"XC-72R" carbon black was slurried in water using 15 mls of water per gram of carbon black. A separate aqueous dispersion was prepared by diluting commercially availabe duPont "Teflon 30" dispersion with water using 57 mls of water per ml of said dispersion.

Then the diluted "Teflon 30" dispersion was gradually added to the "XC-72R" slurry with stirring to make a mixture containing 80 percent "XC-72R" and 20 percent particulate "Teflon." This mixture was washed and dried.

Twenty (20) grams of this dried mixture was chopped with 8.57 grams of sodium benzoate powder and then placed in an R.E.O.-6 Brabender Prep Center mixer equipped with medium cam blades. Forty-five (45) mls of xylene were added as lubricant, and the material was fibrillated at 30 r.p.m. for 10 minutes at room temperature.

After drying, ten (10) grams of the fibrillated mix was chopped with 0.52 grams (g) of one-sixty fourth (1/64) inch long duPont "Teflon Flock" (natural) for 20 seconds to make a uniform blend.

The resulting powder was rolled at roll temperatures of 37° C. and 49° C., respectively, to form a sheet ranging in thickness from 22.5 to 27.5 mils.

A test electrode was pressed at 65° C. and 8.5 tons/in$^2$ with a 30×30×0.006 inch nickel-plated woven wire mesh current distributor. No hydrophobic backing layer was employed.

The electrode was washed free of sodium benzoate with deionized water at 65° C. for 18 hours and then dried. Then the electrode was catalyzed by brushing 0.05 g of chloroplatinic acid in 2 ml isopropanol on the face intended to face the electrolyte, viz., the surface away from the current distributor. The chloroplatinic acid was decomposed to platinum by heating in air at 204° C., and the electrode was then ready for a performance test.

The test electrode, prepared as above, was arranged opposite a nickel counter electrode in a "Plexiglass" test cell filled with 30 percent sodium hydroxide. Temperatures were adjusted to 60° C., and the current was raised in steps to 300 milliamperes per square centimeter (ma/cm$^2$). A mercury-mercuric oxide (Hg/HgO) reference electrode was used to measure the voltage of the test cathode.

At 300 ma/cm$^2$, the test cathode (prepared according to this invention) was only 0.13 volts negative to the reference electrode, an excellent result.

The failure of the test cathode after 159 hours at 300 ma/cm$^2$ was unrelated to the construction of the active layer but was due to excessive wetting of its back surface since no hydrophobic layer was used in fabricating this electrode.

Protection against such wetting can be obtained by use of a PTFE-containing backing layer, e.g., as described in U.S. patent application Ser. No. 202,583 (Docket 3197) filed in the names of Frank Solomon and Charles Grun of even date herewith and entitled "One Pass Process for Forming Electrode Backing Sheet." The disclosure of this application is incorporated herein by reference.

What is claimed is:

1. An electrode active layer comprising a mixture containing particulate carbon black and fibrillated unsintered polytetrafluoroethylene in chopped admixture with sintered polytetrafluoroethylene fibers.

2. An electrode active layer as in claim 1 wherein said fibrillated mixture includes a pore-forming agent.

3. An electrode active layer as in claim 1 including precious metal catalyst.

4. An electrode as in claim 1 wherein said fibers are characterized by an average length of about 0.005 to about 0.05 inch and a denier (per filament) of about 3 to about 10 prior to chopping.

5. An electrode as in claim 3 wherein said precious metal is platinum.

* * * * *